Jan. 5, 1954 R. H. SANBORN 2,664,577
WHEELED DEVICE FOR TRANSPORTING BOATS
Filed Aug. 11, 1948 3 Sheets-Sheet 1
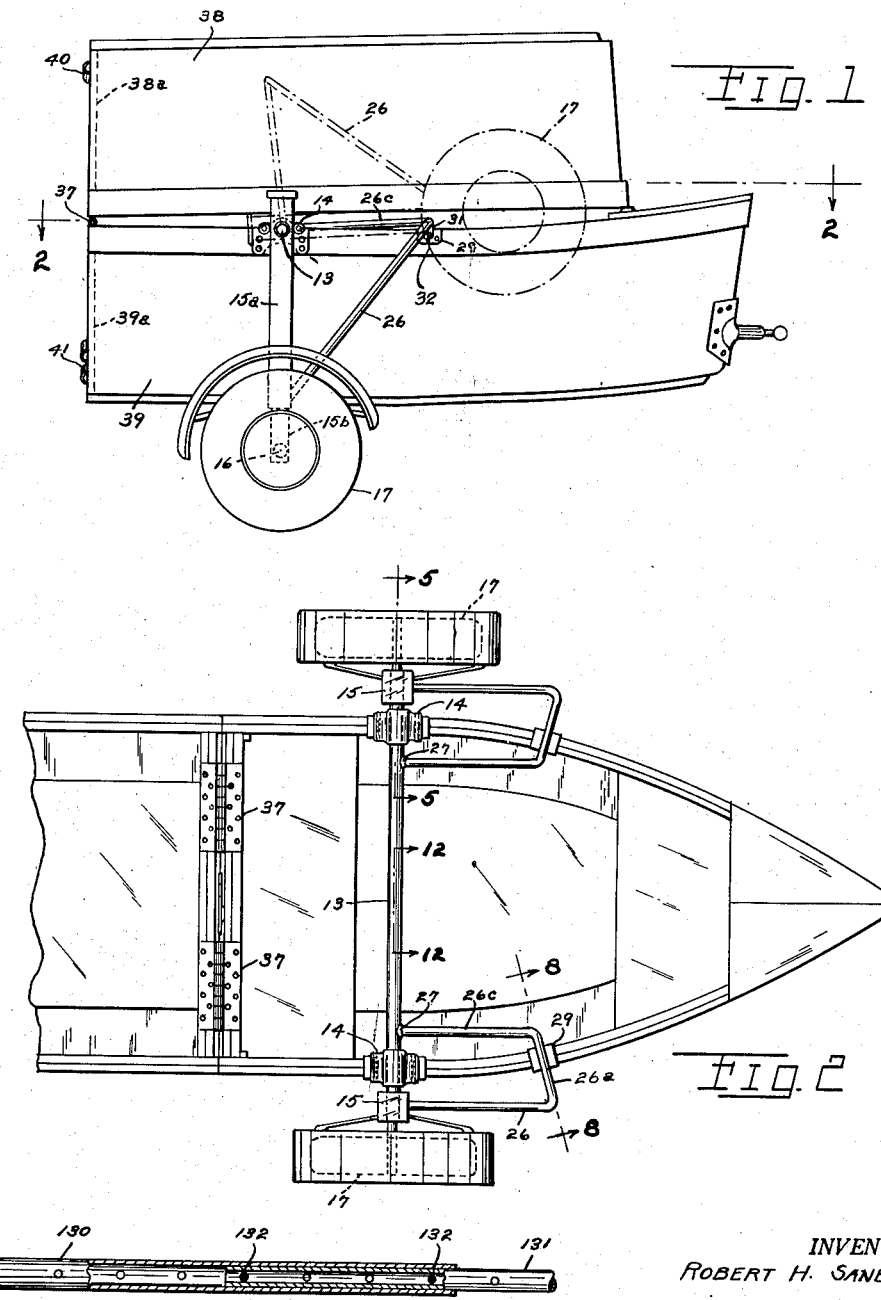
INVENTOR.
ROBERT H. SANBORN
BY
Hyde, Meyer, Baldwin & Doran
ATTORNEYS Jan. 5, 1954 R. H. SANBORN 2,664,577
WHEELED DEVICE FOR TRANSPORTING BOATS
Filed Aug. 11, 1948 3 Sheets-Sheet 2
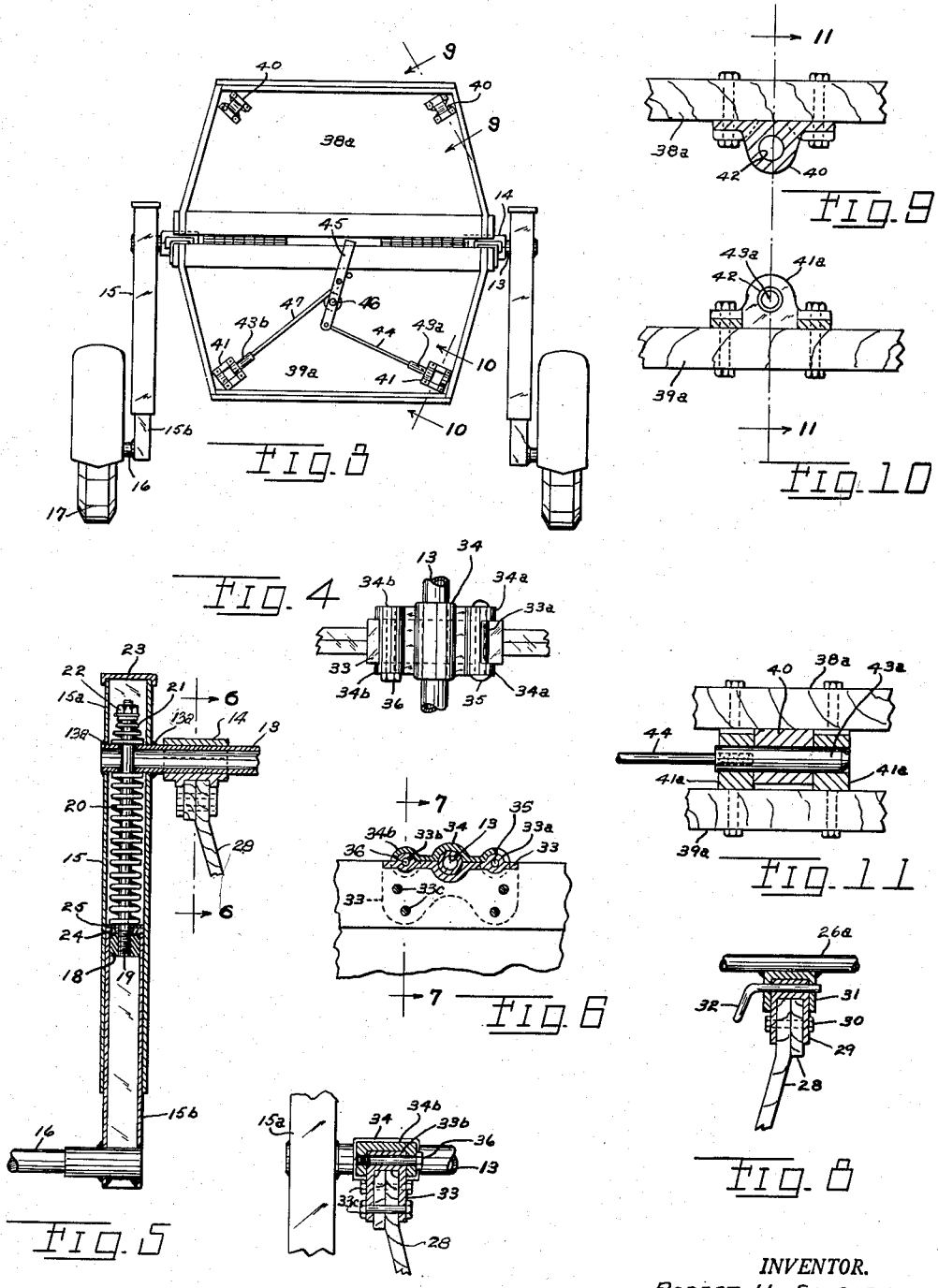
INVENTOR.
ROBERT H. SANBORN
BY
Hyde, Meyer, Baldwin & Doran
ATTORNEYS

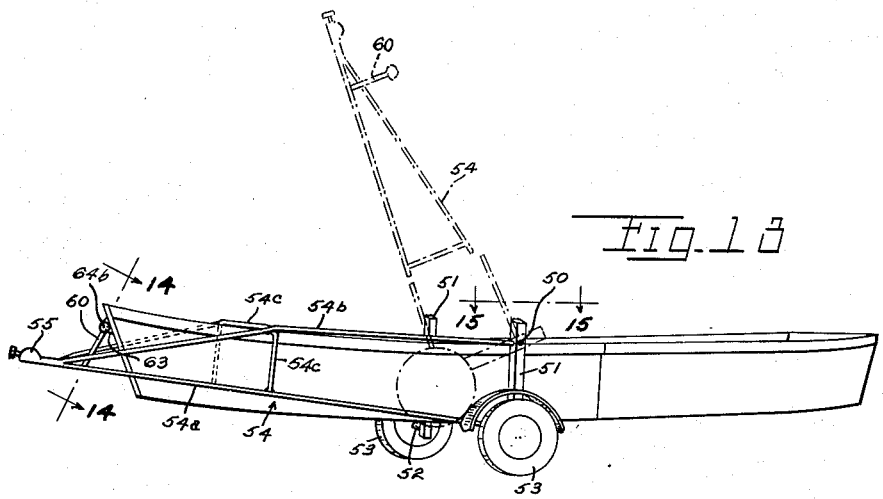
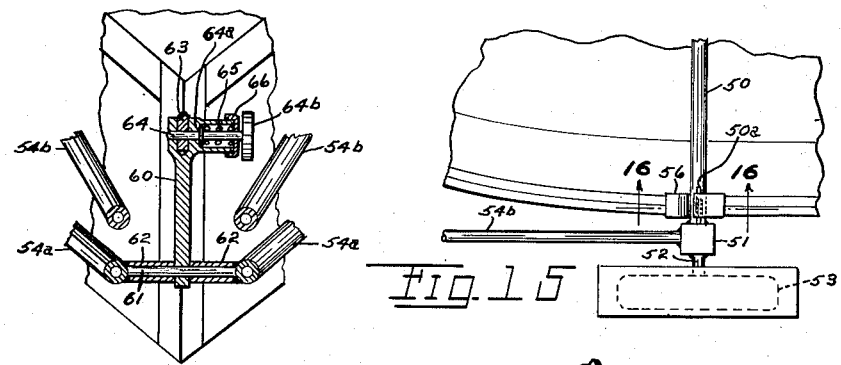
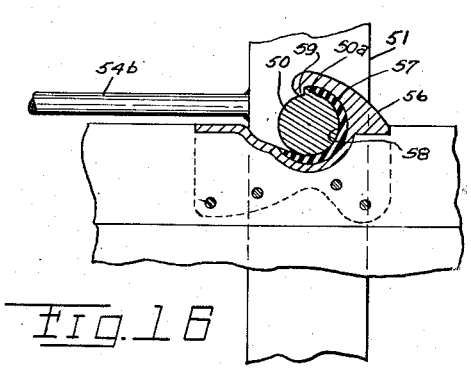
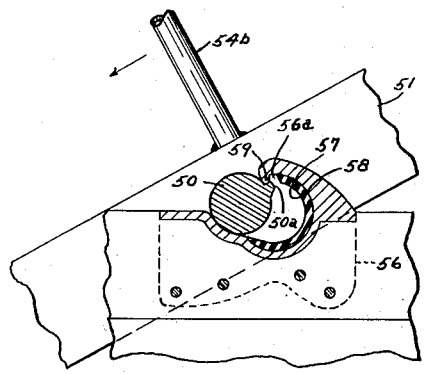
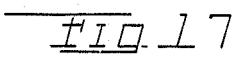

Patented Jan. 5, 1954

2,664,577

UNITED STATES PATENT OFFICE 2,664,577

WHEELED DEVICE FOR TRANSPORTING BOATS

Robert H. Sanborn, Rock Creek, Ohio

Application August 11, 1948, Serial No. 43,670

5 Claims. (Cl. 9—1)

This invention relates to improvements in a trailer and more particularly to a trailer especially adapted to transport an elongated body such as a boat.

One of the objects of the present invention is is provide a trailer comprising very simple frame parts adapted to be attached to a boat and so constructed and arranged that it is simple and easy to manufacture and yet efficient in its operation. Another attribute of my trailer is that it is readily attached and detached from the boat.

Another object of the present invention is to provide a novel wheel supporting strut at each side of the boat.

Still another object of the invention is to provide novel means for bracing the wheel supporting strut when it is in position for transporting a boat along the highway together with novel means for swinging the wheel and its supporting strut out of the way when the boat is afloat.

Still another object of the present invention is to provide a novel arrangement whereby the wheel supporting frame includes adjustable means whereby the device may be quickly fitted to boats of varying widths.

Another novel feature of my invention is the provision of a novel capped bearing on the sides of the boat made so that the cap may be readily released so that the axles and wheel assembly may be easily removed.

A further object of the invention is the provision of a hinged boat adapted to be carried on this particular trailer and a novel means for locking the boat in operating position when the same is afloat in the water.

Another object of the invention is to provide a wheeled truck straddling the boat and rigidly connected with a V-shape draw bar extending forwardly to a point ahead of the prow of the boat. By pivotally mounting this truck to the gunwales of the boat, the draw bar provides a lever for oscillating the truck about the pivotal mounting to move the wheels into and out of boat supporting position.

Still another object of the invention is to provide in the combination of the preceding paragraph, a quick detachable pivotal coupling between the truck which straddles the boat and the gunwales of the boat. A preferred form of this device provides a radial projection on the cross bar of the truck and sockets or recesses in brackets mounted on the boat adapted to receive and hold the cross bar when the truck is in boat transporting position but allowing the cross bar to be rolled out of the recesses when it is desired to place the boat upon the ground.

Other objects and advantages of my invention will be apparent from the accompanying drawings and description and the essential features will be set forth in the appended claims.

In the drawings,

Fig. 1 is a side elevational view of my novel hinged boat in position on my novel carrying trailer. In dot-dash lines I show the position of the wheel and supporting strut when the boat is afloat in the water;

Fig. 2 is a fragmental top plan view taken along the line 2—2 of Fig. 1 and with the stern of the boat straightened around the hinge and locked in position for use when floating in the water;

Fig. 3 is an end elevational view taken at the left hand end of Fig. 1;

Fig. 4 is an enlarged plan view of a portion of Fig. 2 where the trailer frame passes over the gunwale of the boat;

Fig. 5 is an enlarged fragmental sectional view taken along the line 5—5 of Fig. 2;

Fig. 6 is a fragmental sectional view taken along the line 6—6 of Fig. 5;

Fig. 7 is a fragmental sectional view taken along the line 7—7 of Fig. 6;

Fig. 8 is an enlarged fragmental sectional view taken along the line 8—8 of Fig. 2;

Figs. 9 and 10 are enlarged fragmental sectional views taken along similarly numbered lines of Fig. 3;

Fig. 11 is a fragmental sectional view of the parts of Figs. 9 and 10 assembled in locking position;

Fig. 12 is an enlarged fragmental sectional view taken in the general postion of the line 12—12 of Fig. 2, but showing a modification;

Fig. 13 is a perspective view of another form of my carrying trailer having a V-shape frame extending to a point in front of the prow of the boat to provide a draw bar. The dot-dash lines show a second position of the draw bar and wheeled truck;

Figs. 14 and 15 are fragmental views enlarged taken along similarly numbered lines of Fig. 13;

Fig. 16 is a fragmental sectional view further enlarged taken along the line 16—16 of Fig. 15; while Fig. 17 is similar to Fig. 16 but showing another position of the parts.

I have shown a very light and simple frame for providing a trailer for transporting a boat or the like along the highway. This frame comprises a round hollow bar 13 which is removably attached to the opposite side gunwales of the boat by cap bearings 14. On each side of the boat a telescoping vertical strut 15 extends downwardly and supports a stub axle 16 on which is rotatably mounted a wheel 17. As clearly shown in Fig. 5, each strut 15 comprises an upper or outer part 15a which is of non-circular section, a square section being preferred. Slidably fitting in the lower end of the strut member 15a is the telescoping member 15b also of similar conforming non-circular section and, in the present instance, square. It will be noted that the stub axle 16 is brazed or welded to the member 15b. It will also be noted that the bar 13 extends entirely through the strut member 15a and is secured to the walls thereof by means of soldering or welding as indicated at 13a.

Means is provided for resiliently carrying the boat along the highway. This means comprises a plug or cap 18 rigid with the upper end of strut member 15b. Threaded in this cap 18 is a rod 19 which passes upwardly and through a suitable opening in the bar 13. Between the cap 18 and the bar 13 and embracing the rod 19 is a strong spring 20 which supports the weight of the boat as it is resiliently carried over the highway. A light spring 21 surrounds the rod 19 above the bar 13 and snubs the bumping action as the trailer moves over the road. A nut 22 holds all of these parts assembled. A cap 23 closes the top of the strut member 15a.

Novel means is provided for lubricating the telescoping action of the strut member 15b within the member 15a. This comprises a felt washer 24 which is held between the plug 18 and a metal washer 25 which surrounds the rod 19 at the lower end of the spring 20. It results from this construction that when the felt washer 24 is thoroughly soaked in oil the action of the spring 20 as the trailer bumps over the road squeezes small amounts of oil out from time to time to keep the telescoping action of the strut 15 well lubricated.

It is necessary to brace each of the struts 15 to hold it in vertical position while the boat is being transported along the highway. To this end at each side of the boat I provide a brace 26 which is rigidly secured near the lower end of a member 15a and then extends upwardly and forwardly toward the prow of the boat as shown in Figs. 1 and 2 to a point where it is bent inwardly across a portion 26a which crosses the gunwale of the boat. The brace then extends rearwardly along a portion 26c to a point 27 where each brace is rigidly secured to the bar 13 at a point inward from the side of the boat. The detail 26a of each brace where it crosses the gunwale of the boat is clearly shown in Fig. 8. The gunwale of the boat is indicated at 28. At this point the gunwale is protected by the U-shape metal plate 29 which embraces the gunwale and is secured thereto by means of a bolt 30 or other similar securing means. The brace portion 26a has rigidly fastened to it a U-shape plate member 31 adapted to embrace the plate 29. Registering openings are provided in plates 29 and 31 and an L-shape pin 32 is passed through these registering openings so as to hold the brace 26 in the full line position of Figs. 1 and 2 while the boat is being transported. When the boat is in the water, the trailer frame may be entirely removed or it may be swung upwardly to the dot-dash position shown in Fig. 1. To hold the wheel and its associated strut in this dot-dash position, the pin 32 is reversed so that the longer leg of the pin engages beneath and supports strut 15 when the parts are in the dot-dash position of Fig. 1. The details of the cap bearings 14 will now be described with particular reference to Figs. 4, 6, and 7. At suitable locations along the sides of the boat where the same will be properly balanced while being transported in the full line position of Fig. 1, a U-shape lower cap bearing member 33 is provided embracing the gunwale of the boat and properly secured there as by means of the bolts 33c. This plate or bracket includes a male hinge portion 33a which fits between the female hinge portion 34a of the upper cap bearing member 34. A hinge pin 35 secures these members together. At the opposite end of the cap bearing female portions thereof 34b embrace a portion 33b of the lower cap bearing bracket and a removable bolt 36 holds these parts in assembled position while the boat is being transported. When it is desired to drop the boat from the trailer, the bolt 36 is removed from each of the cap bearings 14 and the pin 32 is removed from each of the knee braces 26. This releases the boat from the cross bar 13 allowing the same to drop to the ground.

In a modification shown in Fig. 12, the bar 13 may be arranged so as to accommodate itself to boats of varying widths. As here shown the bar 13 is replaced by a telescoping bar comprising an outer cylindrical member 130 and an inner member or rod 131. Various holes adapted to register in the two members are provided and one or more bolts 132 may be passed through suitable registering openings so as to hold the parts 130 and 131 in various registering positions so as to cause the members 130, 131 to telescope in a lateral direction. Obviously the member 130 would be rigidly secured to one of the side struts 15 and the member 131 would be secured to the other side strut 15.

Novel means is provided for locking the boat when it is unfolded from the positions shown in Figs. 1 and 3. The forward and rear portions of the boat are shown secured together by hinges 37. The rear portion of the boat 38 carries a vertical partition 38a on which are mounted two single locking members 40. The front portion 39 of the boat has a vertical wooden partition 39a on which are mounted two locking members 41, each comprising spaced ears 41a adapted to receive the member 40 between them. These are cylindrical openings 42 in the members 40 and 41a which are adapted to register when the boat is in the folded out position shown in Fig. 2. At this time bolts 43a and 43b are adapted to be passed through the members 40 and 41a so as to lock these parts together. The bolt 43a is secured by a link 44 to a lever 45 below a pivot 46 which mounts the lever on the partition 39a. The bolt 43b is secured by link 47 to the lever 45 at a point above the pivot 46. It results from this construction that when lever 45 is moved in a counterlockwise position from that shown in Fig. 3 each of the bolts 43a and 43b will be thrown into the locking position shown in Fig. 11 so as to lock the halves of the boat in the position of Fig. 2 for floating the same in the water.

It results from the above construction that I have provided a light weight trailer consisting of a very few parts and cheaply and easily constructed. The boat is easily attached to or detached from this trailer. The boat may be launched easily by detaching the trailer from the tractor vehicle and rolling the boat on the wheels 17 into the water after which the wheels may be moved to the dot-dash position of Fig. 1. The whole device requires very little storage space as the equipment in the position of Fig. 1 may be upended and rest upon the partition walls 38a and 39a in a very limited floor space. In spite of simplicity of the parts the boat is strong and rugged and adapted to carry four passengers and a five horsepower motor.

Another form of my invention is shown in Figs. 13 and 17 inclusive. In this form of my device the trailer carrier or truck comprises a cross bar 50 extending across the top of the boat at its midportion and laterally beyond the gunwales. At each end of this cross bar and rigidly connected therewith is a downwardly extending strut 51. At the lower end of each strut is a stub shaft 52 on which is rotatably mounted a wheel 53. Extending forwardly from the truck is a V-shape frame 54 extending forwardly to a point 55 ahead of the prow of the boat and there provided with a draw bar hitch for attachment to a tractor. Each of the side arms of the frame comprises a lower member 54a and an upper member 54b roughly parallel to the sides of the boat and rigidly connected at their rearward ends to the associated strut 51. A bracing member 54c extends from the side arm 54a on one side of the boat upwardly and connected rigidly to the side arm 54b then across the top of the boat and there connected to the side arms 54b and 54a on the opposite side. This makes a very strong frame.

Means is provided for pivotally mounting the cross bar 50 on the gunwales of the boat so that the truck may be rotated about this pivotal mounting. In the present case, a quick detachable mounting is provided as clearly shown in Figs. 15, 16, and 17. A bracket 56 is screwed or bolted on each of the gunwales of the boat and each bracket has a recess 57 adapted to receive the cylindrical cross bar 50. In order to eliminate rattle while the boat is being transported I preferably line each recess with a layer of rubber like material 58 bonded to the metal of the bracket. In order to achieve certain advantages I provide a radially extending projection 50a at each end of the cross bar 50 and I provide a recess 56a at the top of the semi-circular recess 57.

It will now be evident from a study of Figs. 13, 16, and 17, that with the parts in the full line position of Figs. 13 and 16 the wheels 53 will rest upon the ground and the boat will be raised above the ground so as to be transported. When the frame 54 is moved to the dot-dash position of Fig. 13, then the parts are in the position of Fig. 17 and the cross bar 50 may be slid slightly forwardly upwardly out of the recessees 57 in each of the brackets 56 so as to separate the frame and the truck from the boat itself leaving the boat sitting upon the ground.

In the reverse of the above operation the boat resting upon the ground has the truck run over it to a central position where the projections 50a may be slid under the nose 59 of the side brackets engaging in the recesses 56a after which the frame 54 may be oscillated in the direction of the arrow of Fig. 17 which will cause the cross bar 50 to roll into each of the recesses until it reaches the position of Fig. 16.

In order to hold the truck in boat transporting position I provide novel means at the prow end of the boat as clearly shown in Figs. 13 and 14. This comprises a link 60 pivotally mounted on a pin 61 which in turn is rigidly secured to the arm members 54a on each side of the boat. Spacer sleeves 62 hold the link 60 in central position. The upper end of the link is connected with a bracket 63 fastened to the prow of the boat by means of a pin 64 which is normally urged toward locking position by a helical spring 65 which is held between a cap 66 surrounding the pin and a collar 64a on the pin. A knob 64b serves for manipulation of the pin when it is to be disconnected. It should be obvious from a study of Fig. 13 that with the link 60 in its locked position the frame 54 and the truck 50—51—52—53 cannot move out of its boat transporting position. When it is desired to lower the boat to the ground then the link 60 is disconnected and the frame is moved in a clockwise direction from the full line position of Fig. 13 to the dot-dash line thereof.

I claim:

1. In a boat trailer having a vertical strut supporting a wheel, interfitting upper and lower strut portions telescoped together, said strut portions being of similarly shaped interfitting noncircular section, said wheel mounted on said lower strut portion, a helical spring inside said upper strut portion and having its upper end fixed relative to said upper strut portion and having its lower end engaging said lower strut portion, and a compressible layer of lubricant retaining material between the lower end of said spring and said lower strut portion, whereby compression of said spring is effective to squeeze lubricant out of said material to lubricate the telescoping movement of said strut portions.

2. Means for transporting a boat comprising a bar extending crosswise of the boat and laterally beyond the opposite gunwales thereof, means rotatably securing said bar to the boat, a vertical strut secured to each end of said bar in coplanar relationship with said bar and located outside said gunwales, a wheel rotatably mounted at the lower end of each strut, means connected with said boat for maintaining said strut in vertical position, said last mentioned means including a brace rigidly connected with one of said struts below said bar and below the gunwale of the boat, said brace then extending longitudinally of said boat and upwardly, said brace then extending across said gunwale and then extending back to said bar, and there said brace is rigidly connected with said bar, whereby said backwardly extending bar portion serves as a handle operable from within the boat and always being located above said boat gunwales to move said bar, struts and wheels from said vertical position to a retracted position.

3. The combination of claim 2, wherein a releasable connection is provided between said brace and said boat where said brace crosses the gunwale.

4. Means for transporting a boat comprising two vertical struts positioned outside the sides of said boat, each of said struts having upper and lower portions telescoped together, said upper portions being hollow, means removably securing the upper portion of each strut to said boat to maintain said vertical relationship, any portion of said means extending outside and below the top of said boat lying wholly outside of the downward projection of the largest horizontal dimension of said boat, said means including a bar removably secured to said boat and extending through and rigidly secured to said upper strut portion, the lower portion of each strut extending downwardly from its associated upper strut portion and each lower strut portion having a distal lower end resembling a cantilever, a wheel rotatably mounted on the distal end of each lower portion, two rods, each rod being rigid with a corresponding lower strut portion and extending upwardly therefrom centrally of the hollow of the associated upper strut portion, an opening for each of said rods through each end of said bar and within the struts, each of said rods extending through the corresponding opening and terminating above said bar, each upper strut portion containing two helical springs embracing the associated rod, a spring securing member fixed to the terminal end of each rod above said bar, one of said springs in each upper portion engaging said bar and said spring securing member, and the other of said springs in each upper portion extending between and engaging said bar and lower strut portion.

5. Means for transporting a boat comprising two vertical struts positioned outside the sides of said boat, each of said two struts having upper and lower portions telescoped together, the upper strut portion of each strut being hollow, a bar secured to the sides of said boat and extending outwardly through aligned holes in said upper strut portion of each of said struts and there rigidly secured to said upper strut portions, a wheel rotatably mounted on the lower portion of each strut, a rod rigid with said lower portion of each of said struts and extending upwardly therefrom centrally of the hollow of said upper portion of each of said struts, there being an opening through said bar within each of said struts and each of said rods extending through a corresponding one of said openings and above said bar, two helical springs inside said upper portion of each of said struts and embracing said rod, one of said springs extending above and engaging said bar and having a spring securing member on the end of said rod, and the other of said springs extending between and engaging said bar and said lower portion of the corresponding strut.

ROBERT H. SANBORN.

References Cited in the file of this patent

UNITED STATES PATENTS

| Number | Name | Date |
|---|---|---|
| 996,997 | Morris | July 4, 1911 |
| 1,445,792 | Olson | Feb. 20, 1923 |
| 1,462,800 | Clemmer | July 24, 1923 |
| 1,939,863 | Seiter | Dec. 19, 1933 |
| 2,042,598 | Harvey | June 2, 1936 |
| 2,107,494 | Onions et al. | Feb. 8, 1938 |
| 2,171,889 | Payson | Sept. 5, 1939 |
| 2,219,254 | Davis | Oct. 22, 1940 |
| 2,263,710 | Wallace | Nov. 25, 1941 |
| 2,294,110 | Donaldson | Aug. 25, 1942 |
| 2,415,771 | Van Agtmael | Feb. 11, 1947 |
| 2,437,736 | Good | Mar. 16, 1948 |
| 2,451,236 | Oeth | Oct. 12, 1948 |
| 2,489,414 | Holmes | Nov. 29, 1949 |
| 2,494,144 | Restall | Jan. 10, 1950 |
| 2,540,279 | Mosier | Feb. 6, 1951 |